(No Model.)

J. J. POWERS & R. VAN BUREN.
ELECTRICAL CONDUIT FOR BUILDINGS.

No. 503,873. Patented Aug. 22, 1893.

WITNESSES:
C. Neveux
C. Sedgwick

INVENTORS
J. J. Powers
R. Van Buren
BY Munn & Co
ATTORNEYS.

UNITED STATES PATENT OFFICE.

JAMES JEROME POWERS AND ROBERT VAN BUREN, OF BROOKLYN, NEW YORK.

ELECTRICAL CONDUIT FOR BUILDINGS.

SPECIFICATION forming part of Letters Patent No. 503,873, dated August 22, 1893.

Application filed April 27, 1893. Serial No. 472,056. (No model.)

*To all whom it may concern:*

Be it known that we, JAMES JEROME POWERS and ROBERT VAN BUREN, both of Brooklyn, in the county of Kings and State of New York, have invented a new and Improved Electrical Conduit for Buildings, of which the following is a specification, reference being had to the annexed drawings, forming a part thereof, in which—

Figure 1:
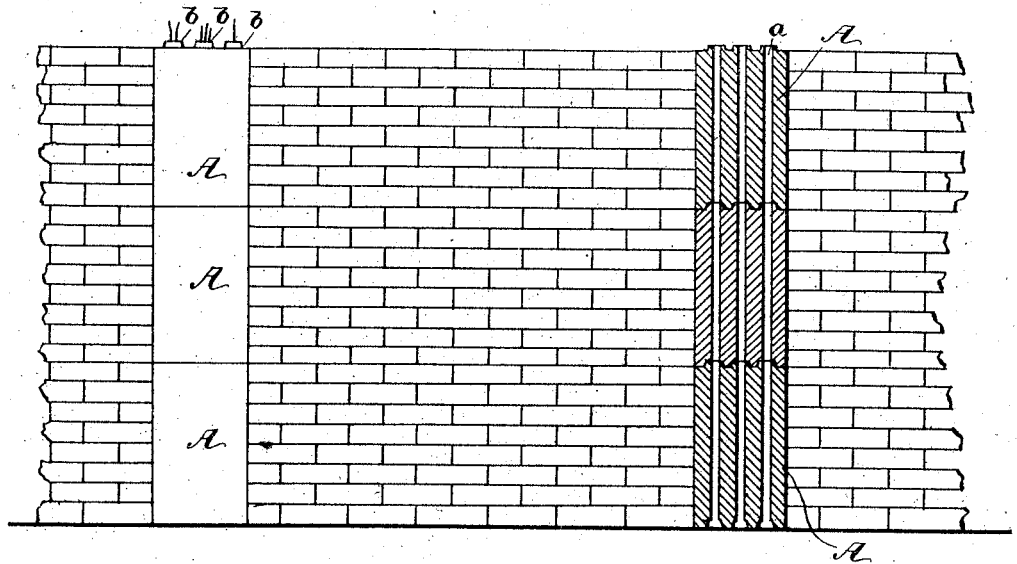
Figure 2:
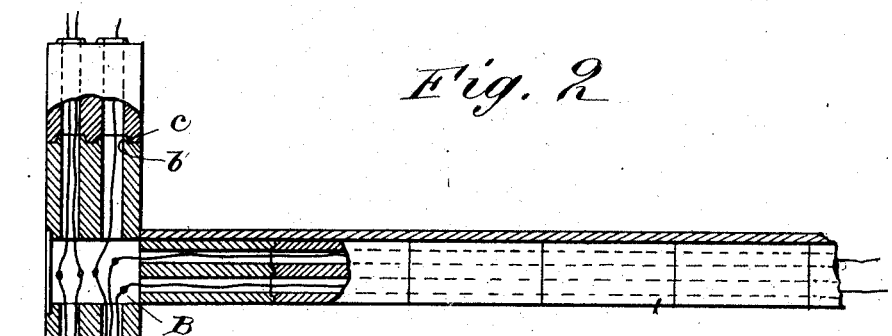
Figure 3:
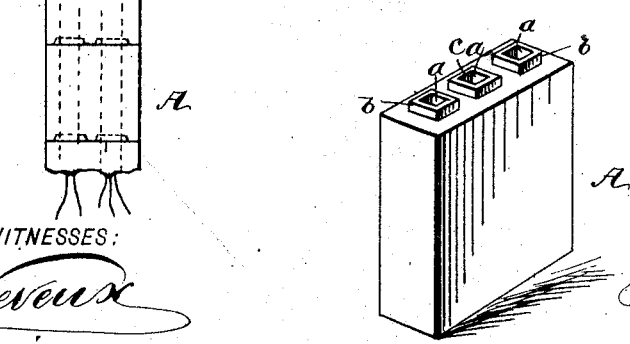

Figure 1 is a side elevation, partly in section, of our improved electrical conduit for buildings, showing its position in a wall. Fig. 2 is a side sectional elevation of our improved conductor, showing the lateral branch; and Fig. 3 is a perspective view of one of the sections of the conduit.

Similar letters of reference indicate corresponding parts in all the views.

The object of our invention is to provide a simple and effective insulating fire-proof conduit for electrical conductors, to be built up in the walls, floors or ceilings of buildings.

Our invention consists in a conduit forming an integral part of the wall, floor or ceiling in which it is placed, the said conduit being built up of sections, each of which is provided with longitudinal apertures for receiving the wires, having collars formed around the apertures at one end of each section, and recesses at the opposite end of each section to receive the collars of the adjacent sections, the said sections being formed of baked clay, which is glazed or enameled, all as will be hereinafter more fully described.

In carrying out our invention, we construct a section A, of a length, width and thickness which is a multiple of the length, width and thickness of a brick, so that it may be laid in a wall, floor or ceiling along with the brick, the said sections being provided with longitudinal apertures $a$, apertures B being formed at different points in the conduit to facilitate the introduction of the wires. Where a single wire is placed in one of the apertures of the conduit, it requires no insulation, as the glazed conduit itself effectually prevents leakage of the current from the wire, but where it is desired to insert a number of wires in the same aperture of the conduit, they must necessarily be insulated. The said sections A may be laid one above the other in a wall, or end to end in a wall, ceiling or floor, care being taken to cause them to register accurately; but to insure a perfect registration of the different sections, so as to form a continuous smooth passage through the conduit, we prefer to form a collar $b$ around each longitudinal aperture at one end of the section, and to form at the opposite end of the section a recess $c$ around the aperture, for receiving the collar $b$ of the adjacent section.

The advantages in the use of our improved conduit are that it may be placed in a building and the wiring may be omitted for any length of time. If a conductor laid in our improved conduit becomes overheated or even fused, or if an arc is formed between a pair of conductors in the conduit, no harm can result to the building to which our improved conduit has been applied. Our improved construction also admits of changing the wiring whenever necessary.

Having thus described our invention, we claim as new and desire to secure by Letters Patent—

In an electrical conduit for buildings, a series of baked clay sections apertured longitudinally and provided with collars around the apertures at one end of the section, and recesses around the apertures at the opposite end of the section for receiving the collars of the adjacent section, the said sections being made of a suitable proportion for laying along with the brick in a brick wall, and glazed interiorly, and left unglazed on the exterior, with a rough surface to adapt it to receive and hold mortar substantially as specified.

JAMES JEROME POWERS.
ROBERT VAN BUREN.

Witnesses:
E. M. CLARK,
F. W. HANAFORD.